(12) United States Patent
Schneider et al.

(10) Patent No.: US 11,339,938 B2
(45) Date of Patent: May 24, 2022

(54) VEHICLE HEADLIGHT HAVING A LIGHT SOURCE

(71) Applicant: DAIMLER AG, Stuttgart (DE)

(72) Inventors: Bernd Schneider, Gärtringen (DE); Alexander Gröger, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/291,741

(22) PCT Filed: Oct. 21, 2019

(86) PCT No.: PCT/EP2019/078546
§ 371 (c)(1),
(2) Date: May 6, 2021

(87) PCT Pub. No.: WO2020/094376
PCT Pub. Date: May 14, 2020

(65) Prior Publication Data
US 2022/0010940 A1    Jan. 13, 2022

(30) Foreign Application Priority Data
Nov. 8, 2018   (DE) ..................... 10 2018 008 760.4

(51) Int. Cl.
| *F21S 41/63* | (2018.01) |
| *F21S 41/153* | (2018.01) |
| *F21S 41/20* | (2018.01) |
| *B60Q 1/00* | (2006.01) |
| *B60Q 1/08* | (2006.01) |

(52) U.S. Cl.
CPC .......... *F21S 41/635* (2018.01); *B60Q 1/0041* (2013.01); *B60Q 1/08* (2013.01); *F21S 41/153* (2018.01); *F21S 41/20* (2018.01)

(58) Field of Classification Search
CPC ......... F21S 41/635; F21S 41/153; F21S 41/25
See application file for complete search history.

(56) References Cited

U.S. PATENT DOCUMENTS

| 8,931,939 B2 | 1/2015 | Melzner et al. |
| 9,341,335 B2 | 5/2016 | Weissenberger et al. |
| 9,423,092 B1 * | 8/2016 | Deyaf .................. F21S 41/285 |

(Continued)

FOREIGN PATENT DOCUMENTS

| DE | 9301883 U1 | 6/1993 |
| DE | 102004012519 A1 | 10/2004 |

(Continued)

OTHER PUBLICATIONS

Office Action created Aug. 10, 2021 in related/corresponding DE Application No. 10 2018 008 760.4.

(Continued)

*Primary Examiner* — Matthew J. Peerce
(74) *Attorney, Agent, or Firm* — Patent Portfolio Builders PLLC

(57) ABSTRACT

A vehicle headlight includes a light source and an adjustable objective. The light source is designed as a field having a plurality of microlight sources. The adjustable objective includes at least three lens groups, at least two of which are designed to be displaceable along the optical axis in order to adjust the focal length and the focal plane.

12 Claims, 2 Drawing Sheets

(56) References Cited

U.S. PATENT DOCUMENTS

Figure 1:
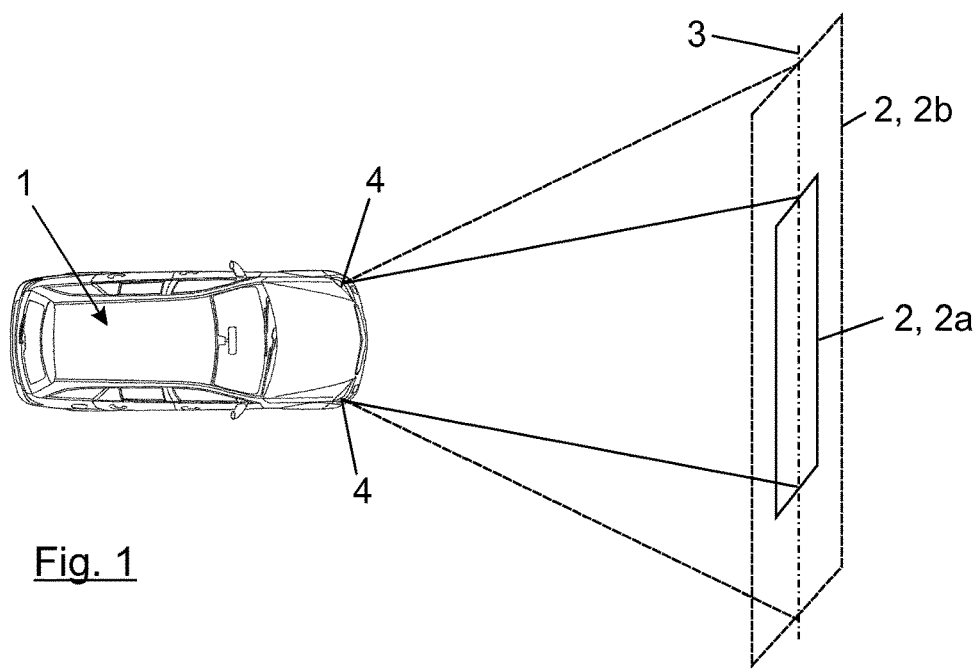

| | | | |
|---|---|---|---|
| 10,228,118 B2* | 3/2019 | Yagi | F21S 41/255 |
| 10,351,047 B2 | 7/2019 | Fiege et al. | |
| 10,591,126 B2 | 3/2020 | Mandl | |
| 10,724,696 B2* | 7/2020 | Rasmussen | F21V 11/08 |
| 10,788,184 B2* | 9/2020 | Mouri | F21S 41/43 |
| 2014/0029287 A1 | 1/2014 | Anzai et al. | |
| 2014/0175978 A1 | 6/2014 | Kobayashi | |
| 2018/0132330 A1* | 5/2018 | Chong | H05B 45/20 |
| 2018/0313510 A1 | 11/2018 | Albou | |

FOREIGN PATENT DOCUMENTS

| | | |
|---|---|---|
| DE | 102006053019 A1 | 5/2008 |
| DE | 202011000481 U1 | 5/2011 |
| DE | 102011079570 A1 | 1/2013 |
| DE | 102012224345 A1 | 6/2014 |
| DE | 102013110272 A1 | 3/2015 |
| DE | 102015013271 A1 | 4/2017 |
| KR | 20170112640 A | 10/2017 |
| WO | 2011020920 A1 | 2/2011 |
| WO | 2017066817 A1 | 4/2017 |

OTHER PUBLICATIONS

International Search Report dated Jan. 24, 2020 in related/corresponding International Application No. PCT/EP2019/078546.
Written Opinion dated Jan. 24, 2020 in related/corresponding International Application No. PCT/EP2019/078546.

* cited by examiner

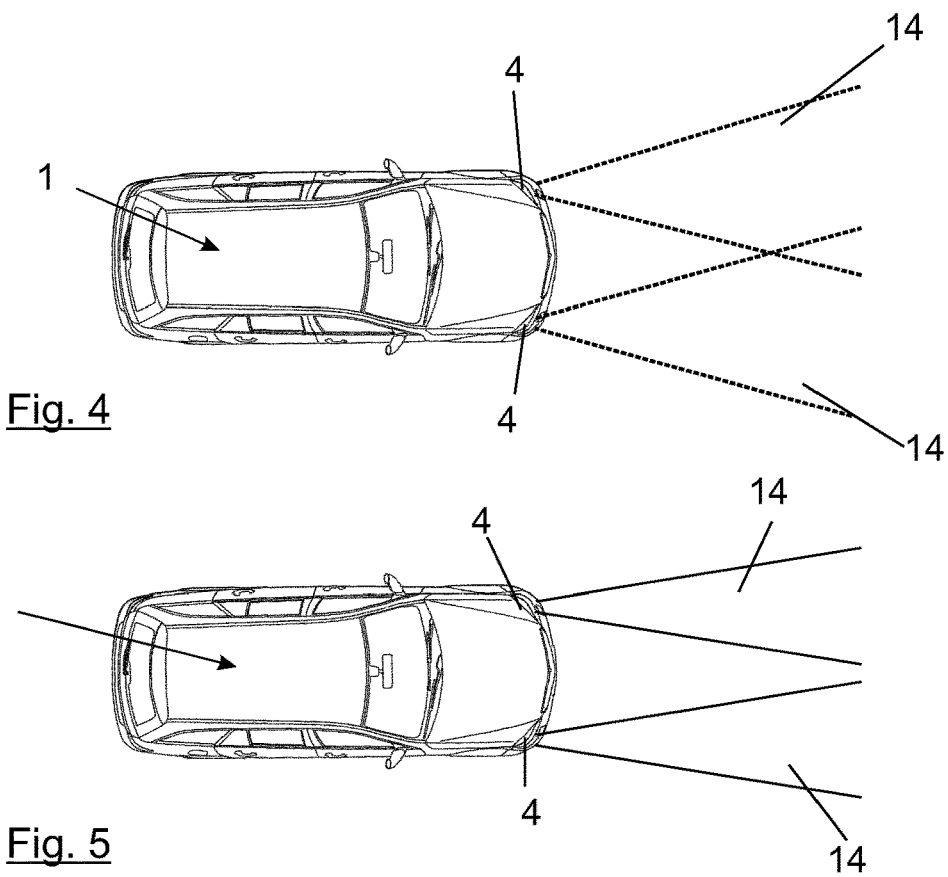
Fig. 4
Fig. 5
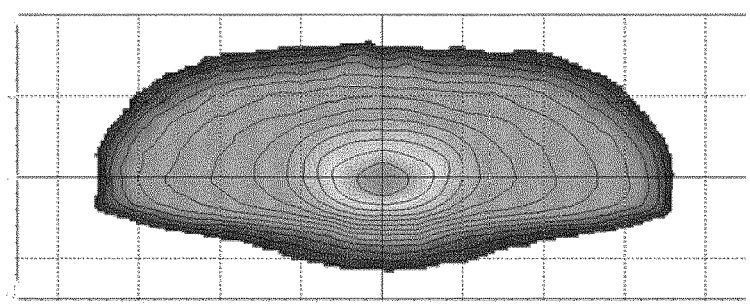
Fig. 6
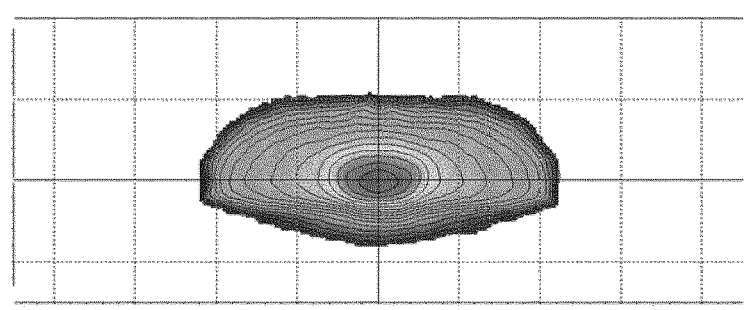
Fig. 7

VEHICLE HEADLIGHT HAVING A LIGHT SOURCE

BACKGROUND AND SUMMARY OF THE INVENTION

Exemplary embodiments of the invention relate to a vehicle headlight having a light source and having an adjustable objective.

Vehicle headlights having a light source and an adjustable objective are known in principle from the prior art. In this regard, for example, reference can be made to DE 10 2006 053 019 A1. Here, the adjustable objective comprises at least one movable lens which cooperates with a reflector and a gas-discharge lamp as light source. This affords the possibility of correspondingly expanding the beam of light, i.e., ultimately varying the magnification of the projection in the plane of illumination by adjusting the focal length. In practice, this is associated with the disadvantage of blurring, since a sharp image is only possible in a plane of illumination, predefined by construction, at the corresponding focal length. Such blurring is a serious disadvantage, particularly if parts of a full beam cone are to be hidden by means of appropriate measures, for example to reduce the glare for oncoming traffic.

However, trends in technology are increasingly moving in precisely this direction. Thus, for example, the surroundings of the motor vehicle are to be detected by environment sensors. The objects detected are then classified and, if required, illuminated by a corresponding actuation of the light source of the headlight or even excluded from illumination, for example oncoming vehicles, so as not to dazzle them. In this regard, DE 10 2015 013 271 A1 describes a structure with an LED pixel light source which can achieve this. Then, DE 10 2015 013 271 A1 describes, inter alia, that sharply focusing optics would be desirable in order now to place this desired light image of the light source into the plane of illumination and thus "onto the road" as it is actually intended. However, the disadvantage is that corresponding optics only enable an actual sharp image at precisely one distance. However, depending on the traffic situation, there may be different distances of the plane of illumination, which can lead to problems. For this reason, the document proposes a movement between the optics and the field of the pixel light sources, which is effected by tilting the field of the pixel light sources.

In practice, this is relatively complex and relatively limited in terms of focusing at different distances. Moreover, it is not possible to achieve independent adaptation of the size of the image in the plane of illumination, since the beam of the light source cannot be expanded, since the focal length remains substantially the same.

Headlights or spotlights with variable objectives are likewise known from the further prior art, and in particular here from the field of stage illumination technology, for example from WO 2011/020920 A1 or from DE 20 2011 000 481 U1.

Exemplary embodiments of the present invention are directed to further improving, in terms of its intended purpose, a vehicle headlight, in particular a front headlight for a vehicle, having a light source and an adjustable objective.

The vehicle headlight according to the invention first of all uses a field having a plurality of microlight sources as light source, contrary to the previous headlights known from the prior art. Such a field having a plurality of microlight sources, for example microLEDs or micromirrors, which transmit the light in a targeted manner in the desired direction, or else deflect it therefrom, allow for very sharp resolution of the resulting light image. The definition of a plurality of microlight sources according to the present description covers a structure which has a number of more than 10,000, in particular between 30,000 and 1.5 million, microlight sources.

This structure of a vehicle headlight having a field having a plurality of such microlight sources is now additionally provided with an adjustable objective. Contrary to the objectives known from the prior art, this objective has the particularity of comprising at least three lens assemblies, at least two of which are designed to be displaceable along the optical axis in order to adjust the focal length and the focal plane. The objective of the vehicle headlight having the plurality of microlight sources is therefore designed such that it can adjust the focal length, and therefore the magnification, on the one hand, and on the other hand can adapt the focal plane. Such an objective was hitherto not used in this way in vehicle headlights, in particular in vehicle headlights having a plurality of microlight sources. Its operating principle substantially corresponds to that of a zoom lens, as known from photography. The inventor has discovered that using this the other way around in the vehicle headlight now makes it possible on the one hand to accordingly adapt the size of the image in the desired plane of illumination and at the same time to focus the image in the desired plane of illumination. Thus, all of the disadvantages of the prior art described at the outset are prevented in the vehicle headlight according to the invention.

A very high resolution image due to the plurality of microlight sources can therefore now be displayed at the desired size and with a high degree of sharpness in the desired plane of illumination, when viewed at any desired distance from the vehicle. The image of the specified light-dark distribution, which results from the calculations of an intelligent light control system in a manner known per se, in particular via the data from environment sensors in the vehicle, can therefore be placed "onto the road" very precisely and exactly in the respective desired plane of illumination.

According to an advantageous development of the concept, each of the lens assemblies has at least one optical lens, and therefore the size and sharpness of the image of the light-dark distribution on the road can be influenced over a correspondingly large magnification range. Here, furthermore, an aperture diaphragm may be provided, and/or one or more of the surfaces of one or more elements of the objective can be aspherical. Here, the materials of the individual elements of the objective can have different refractive indices, such that different materials or materials with different densities can be used, in particular in order to achieve a simple and compact structure. Of course, optical optimizations such as diffractive structures on the surfaces, anti-reflection coatings or variable liquid lenses or the like can be used additionally.

A further highly advantageous configuration of the headlight according to the invention additionally or alternatively provides for the positioning of individual or several elements of the optical system relative to one another and/or the positioning of the whole optical system relative to the light source to be effected by DC motors, stepper motors and/or piezo actuators.

Further advantageous configurations of the concept also emerge from the exemplary embodiment which is described in more detail below with reference to the figures.

BRIEF DESCRIPTION OF THE DRAWING FIGURES

Figure 2:
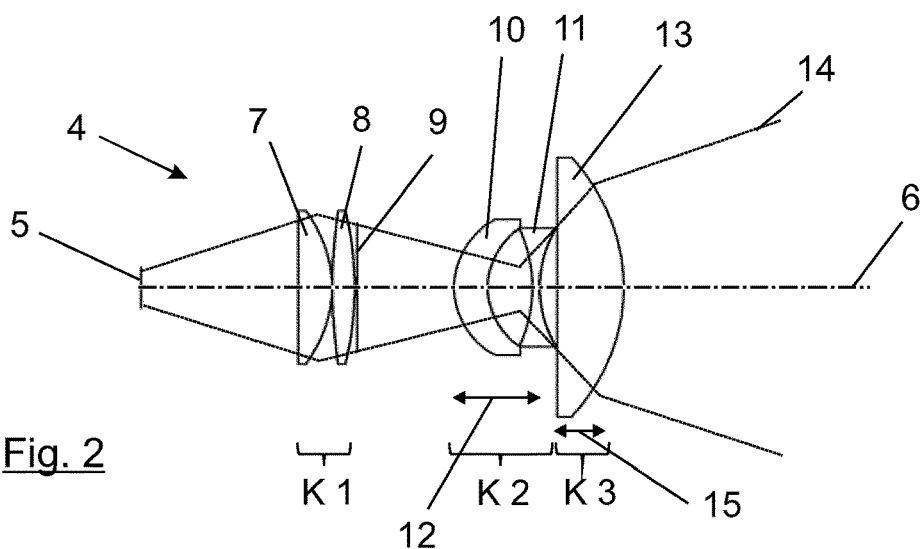
Figure 3:
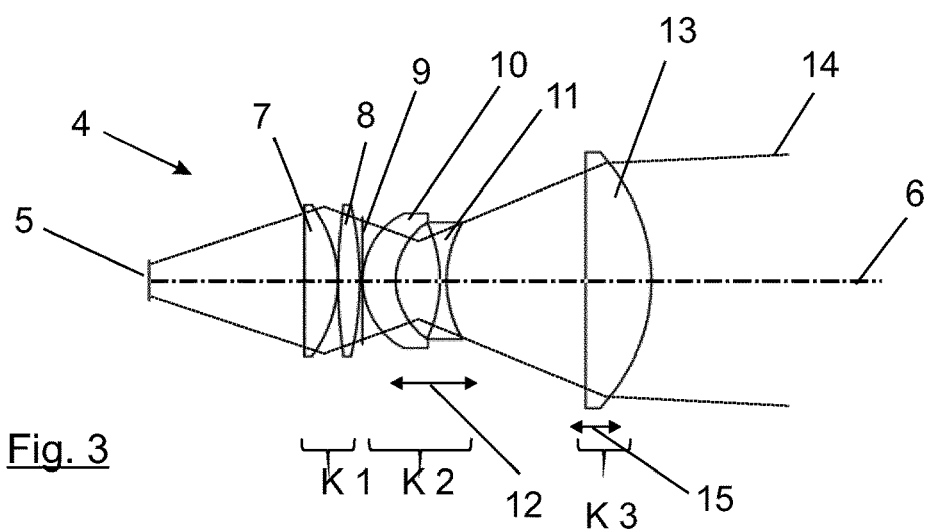

The figures show:

FIG. 1 a schematic diagram of a vehicle in a view from above with a projection of a light-dark distribution in various sizes produced by the front headlight of the vehicle in a plane of illumination;

FIG. 2 an exemplary adjustable objective for use in the headlight according to the invention in a first extreme position;

FIG. 3 an exemplary adjustable objective for use in the headlight according to the invention in a second extreme position;

FIG. 4 a schematic depiction of the light cone of the front headlight of a vehicle in the extreme position shown in FIG. 2;

FIG. 5 a schematic depiction of the light cone of the front headlight of a vehicle in the extreme position shown in FIG. 3;

FIG. 6 an exemplary depiction of a simulated full beam distribution in the extreme position depicted in FIG. 2; and FIG. 7 an exemplary depiction of a simulated full beam distribution in the extreme position depicted in FIG. 3.

DETAILED DESCRIPTION

The depiction of FIG. 1 shows a birds-eye view of a vehicle 1. The possibility of emitting light with different focal lengths and thus with a different beam expansion from the front headlights 4 of the vehicle, which are not visible here, is shown in front of the vehicle 1 as a light image 2 in a plane of illumination designated 3. Here, the solid line three-dimensionally depicts a small magnification 2a, the dashed line a correspondingly larger magnification 2b, of the light image 2 in the plane of illumination 3.

In order now to achieve both the desired size 2a, 2b of the light image 2, and also a high degree of sharpness of the light image in the plane of illumination 3, the vehicle headlight 4 can be constructed in the manner depicted schematically in FIG. 2. The vehicle headlight 4 has, as light source, a field 5 of microlight sources, which are controlled by an intelligent light control system, not shown here, such that they give out a light-dark distribution as light image 2 for projection onto the road and in the plane of illumination 3. As can be seen in the schematic depiction from FIG. 2, this light image 2 is now emitted along an optical axis 6 into the environment. In the process, it passes through three lens assemblies K 1, K 2 and K 3. The lens assembly K 1, which here has for example two lenses 7, 8 and an aperture diaphragm 9, is not displaceable along the optical axis 6 in the exemplary embodiment shown here, and is accordingly fixed. Thus, there is a defined distance to the field 5 of the microlight sources. The lens assembly K 2 likewise consists of two lenses 10, 11 and, as accordingly indicated by the arrow designated 12, is displaceable along the optical axis 6. In the exemplary embodiment of FIG. 2 shown here, it is depicted directly adjacent to the lens group K 3 with a lens 13 and thus in one of its extreme positions, namely the "minimum focal length" extreme position. The emerging light cone designated 14 is correspondingly wide. The lens group K 3 is also displaceable, as indicated by the arrow 15.

The aperture diaphragm can also optionally be designed to be displaceable. An additional iris diaphragm may also likewise be present in the headlight.

In the depiction of FIG. 4, a plan view of the vehicle 1 shows, in this "minimum focal length" position of the lens groups K 1, K 2, K 3 of the front headlight 4, roughly what the schematically depicted light cones 14 look like. They become correspondingly wide very quickly, and are particularly suited to large-area illumination of a plane of illumination 3, not shown in more detail here. The possibility of displacing in particular the lens groups K 2 and K 3 relative to the lens group K 1 and relative to one another makes it possible to precisely adjust, in addition to the desired width of the emerging light cone 14, the sharpness in the plane of illumination 3, such that, in the desired plane of illumination 3, an image of the field 5 of the microlight sources is given both in a variable size and with a desired degree of sharpness, typically the maximum possible.

FIG. 6 shows, in this situation of the "minimum focal length" position, the light distribution using a corresponding simulation, with the light distribution being accordingly brightest in the center and the values decreasing towards the edge, as can be seen from the various scales of grey in the depiction in FIG. 6.

The depiction in FIG. 3 now in turn picks up the same depiction as in FIG. 2. The lens assembly K 2, with its two lenses 10, 11, is now in its other extreme position, namely in the "maximum focal length" position. The emerging light cone 14 is therefore correspondingly narrower and extends to a greater distance, in order to be able to illuminate objects at this greater distance in a targeted manner and to be able to recognize them. FIG. 5 in turn shows, analogously to FIG. 4, the corresponding view of the vehicle 1 with the emerging light cones 14 from above. Particularly by directly comparing the figures, it can be very clearly seen that the schematically depicted emerging light cones 14 are correspondingly narrower here and therefore also provide a higher light intensity even at a greater distance. This can also be seen from the depiction in FIG. 7. Analogously to the depiction in FIG. 6, here again the simulation of the light distribution is depicted. Overall, the illuminated area in the plane of illumination 3 selected by way of example is correspondingly smaller; hence, the light intensity in the center is considerably higher.

Between these two described extreme positions of the maximum focal length in FIGS. 3, 5 and 7, and also the minimum focal length in FIGS. 2, 4 and 6, any desired intermediate values can also be set. This allows the image of the field 5 of the microlight sources in the desired plane of illumination 3 to be displayed at the required size and with the required degree of sharpness, such that a plurality of different illumination subjects can be observed with the vehicle headlight 4 according to the invention, in particular also adaptive illumination in the sense described at the outset, in which objects detected using environment sensors can be illuminated in a targeted manner or even not illuminated, for example in order to prevent dazzling oncoming traffic or dazzling oneself by the very bright illumination of a traffic sign or the like. Furthermore, objects in the environment can be illuminated in a targeted manner, in order to be able to better identify and classify these using environment sensors, for example cameras or the like.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle headlight, comprising:
a light source having a field comprising a plurality of microlight sources configured to produce a light image; and
an adjustable objective comprising at least three lens groups, wherein at least two lens groups of the at least three lens groups are displaceable along an optical axis of the vehicle headlight to adjust a focal length and a focal plane and lenses of a third lens group of the at least three lens groups is not displaceable along the optical axis such that a size of the light image in a plane of illumination and a focusing of the light image in the plane of illumination are adjustable; and
wherein the third lens group includes an aperture diaphragm that is not displaceable along the optical axis.

2. The vehicle headlight of claim 1, wherein the microlight sources have microLEDs or micromirror devices.

3. The vehicle headlight of claim 1, wherein the field comprises 30,000 to 1.5 million microlight sources.

4. The vehicle headlight of claim 1, wherein each of the at least three lens groups has at least one optical lens.

5. The vehicle headlight of claim 1, wherein the adjustable objective has at least one aperture diaphragm.

6. The vehicle headlight of claim 1, wherein the adjustable objective additionally contains an iris diaphragm.

7. The vehicle headlight of claim 1, wherein one or more surfaces of one or more optical elements of the adjustable objective are aspherical, and have diffractive structures or an anti-reflection coating.

8. The vehicle headlight of claim 1, wherein materials of individual optical elements of the adjustable objective have different refractive indices.

9. The vehicle headlight of claim 1, further comprising:
DC motors, stepper motors, or piezo actuators arranged to displace the at least two lens groups.

10. The vehicle light of claim 1, wherein the third lens group is arranged closer to the light source than the first and second lens groups.

11. The vehicle light of claim 1, wherein the second lens group comprises two convex-concave lenses.

12. The vehicle light of claim 11, wherein the first lens group comprises a plano-convex lens, and the second lens group is arranged closer to the light source than the first lens group.

* * * * *